(12) United States Patent
Gale et al.

(10) Patent No.: US 8,146,095 B2
(45) Date of Patent: Mar. 27, 2012

(54) METHOD, APPARATUS AND COMPUTER PROGRAM PRODUCT FOR MANAGING PERSISTENCE IN A MESSAGING NETWORK

(75) Inventors: Martin J Gale, Eastleigh (GB); Robert Smart, Southampton (GB); Andy J Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 1239 days.

(21) Appl. No.: 11/770,965

(22) Filed: Jun. 29, 2007

(65) Prior Publication Data
US 2008/0127209 A1 May 29, 2008

(30) Foreign Application Priority Data
Jul. 1, 2006 (GB) .................................. 0613195.7

(51) Int. Cl.
*G06F 13/00* (2006.01)
(52) U.S. Cl. ......................... 719/313; 719/314; 719/318
(58) Field of Classification Search .................. 719/313, 719/314, 318
See application file for complete search history.

(56) References Cited

U.S. PATENT DOCUMENTS
2002/0078132 A1* 6/2002 Cullen et al. .................. 709/201
2006/0253590 A1* 11/2006 Nagy et al. .................... 709/226
\* cited by examiner

*Primary Examiner* — Andy Ho
(74) *Attorney, Agent, or Firm* — Robert C. Rolnik; David A. Mims; Herman Rodriquez

(57) ABSTRACT

Provided are method, apparatus and computer program product for managing persistence in a messaging network. A determination of whether to save data relating to a message-based communication to persistent storage at a message server is made with reference to characteristics of at least one messaging client involved in the message-based communication. The characteristics may include, for example, connection reliability information for the client's previous connections to the message server, such as numbers of disconnections within a defined period or average connection duration, for a messaging client to which at least one message is to be transmitted by the message server. The characteristics may represent a number of matching subscribers per publication. These and/or other example characteristics may be captured in a database at the message server and may be evaluated (for example by SQL queries applied to the database) to determine whether a persistent save operation is required or can be omitted.

10 Claims, 9 Drawing Sheets

FIG. 3

| CLIENT_ID | METRIC_KEY | METRIC_VALUE |
|---|---|---|
| 1 | CONTIME | 1:03:81 |
| 1 | CONTIME | 1:55:63 |
| 2 | CONTIME | 8:55:09 |
| 1 | CONTIME | 1:13:22 |

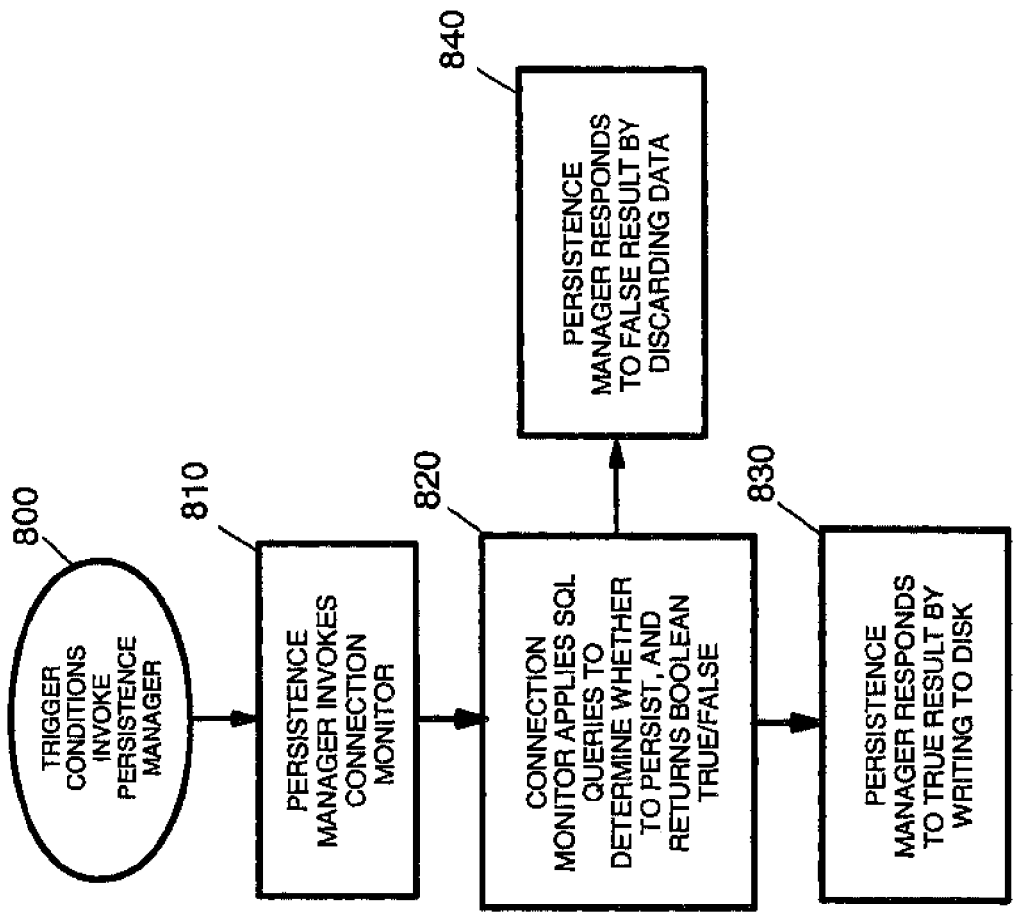

FIG. 8

| CLIENT_ID | METRIC_KEY | METRIC_VALUE |
|---|---|---|
| 1 | CONTIME | 1:30:25 |
| 1 | CONTIME | 1:20:13 |
| 2 | CONTIME | 0:53:02 |
| 1 | SUBS_TO_PUB | 25 |
| 1 | SUBS_TO_PUB | 22 |

METHOD, APPARATUS AND COMPUTER PROGRAM PRODUCT FOR MANAGING PERSISTENCE IN A MESSAGING NETWORK

FIELD OF INVENTION

The present invention relates to management of persistence of messages and state information in a messaging network.

BACKGROUND

Some known messaging systems provide persistent messaging, in which message state information and messages are saved to logs and message queue data files in persistent storage (such as disk storage). Persistently stored messages are able to survive most failures and restarts of the messaging system. In response to a failure other than a disk failure, the state information and messages can be recovered from the logged data and persistently-stored queues. The recoverability of persistent messages and state information is a significant factor in achieving assured once-only message delivery.

For example, a message queue manager may save a persistent message to disk storage before confirming to an application program that an operation has been successfully performed on the message. In a typical messaging network, a message-sending application program issues a 'put_message' instruction via an API call, to place an outgoing message in a queue. A local queue manager program manages this queue and communicates with other local application programs, or other queue managers within a distributed messaging network, to transfer the message to a target recipient. In a persistent messaging system, the local queue manager saves the message to persistent storage before confirming to the sender application that the 'put_message' operation completed successfully. A persistent message may be written to disk for every 'put_message' and 'get_message' that is performed to transfer the message to its destination (in some implementations, where the message is outside the current syncpoint-manager controlled 'unit of work'), or the message may only be logged when a current unit of work is committed. With distributed units of work, it may be possible to avoid writing logs at a number of intermediate points during a message transfer, but a message that is identified as 'persistent' will be written to persistent storage at a pre-defined point.

In contrast, non-persistent messages are discarded when a queue manager experiences a failure and has to restart, as well as when the queue manager is stopped by an operator command. Although persistent messaging provides great advantages in terms of recoverability and assured message delivery, persistent messaging also has a performance cost. Writing to disk for every 'put_message' and 'get_message' operation will reduce message throughput and increase application response times, so there is a business justification for handling some messages non-persistently.

Because of the tradeoff between assured message delivery and performance, the WebSphere MQ family of products from IBM Corporation include support for setting persistence or non-persistence as optional attributes of a message and considerable work has been done to improve performance of persistent messaging (WebSphere and IBM are trademarks of International Business Machines Corporation). Performance has been enhanced by use of high performance disk storage, commit processing techniques that optimize performance in the absence of failures, and efficient recovery techniques to deal with failures. For example, U.S. Pat. No. 5,452,430, filed on 23 Mar. 1994 and assigned to IBM Corporation, describes an approach to handling persistent and non-persistent messages that aims to reduce delays during recovery from a system failure, by storing persistent and non-persistent data in separate sets of pages within a single message queue. C. Mohan and D. Dievendorff, "Recent Work on Distributed Commit Protocols, and Recoverable Messaging and Queuing" IEEE Data Engineering Bulletin, 17 (1), pages 22-28, 1994, describes developments in the areas of distributed commit protocols and recoverable messaging and queuing.

Nevertheless, many messaging systems still invest too much of their resources on ensuring message integrity, and typical messaging systems still have a relatively inflexible specification of persistence. One proposal is to give messaging system users an opportunity to specify a different persistence policy for different system states. In such a messaging system, users would benefit from an increased granularity of control over persistence but significant processing costs would remain and the persistence behaviour is fixed when the persistence policy is specified.

SUMMARY

A first aspect of the present invention provides a method for managing persistence within a messaging network comprising the steps, performed by a message server, of: identifying characteristics of at least one messaging client involved in a message-based communication; determining from said characteristics whether data relating to the message-based communication requires saving to persistent storage; and saving data relating to the message-based communication to persistent storage in response to a positive result of said determining step.

According to a first embodiment of the invention, the step of identifying characteristics comprises identifying connection characteristics of a messaging client to which at least one message is to be transferred by the message server, and the determining step comprises determining from said connection characteristics whether data relating to the at least one message requires saving to persistent storage. Data relating to connections between the messaging client and a message server is captured at that message server and may be aggregated to generate statistical information representing the connection characteristics of the (or each) client. The message server then performs the identifying and determining steps with reference to this saved data. Alternatively, data may be provided to the message server periodically by the (or each) messaging client.

A messaging client in this context is a communications endpoint within a messaging network, and may comprise either a client data processing device or an arrangement of computer hardware and/or software running on such a device which is the origin or target destination for the message. For example, a messaging client may comprise a target application program that is separate from a message server. A message server in this context may comprise a message manager computer program (or equivalent functionality implemented in hardware electronic circuitry) for handling transfer of messages via the messaging network, or the message server may comprise a data processing apparatus running such a message manager.

In one particular embodiment, the connection characteristics represent recent connectivity history data for a particular destination messaging client, such as the number of disconnections and/or reconnections to the message server within a defined period of time, or the average 'up time' or 'down time' for that client. The connectivity history provides an indication of the reliability of connections between the message server and the messaging client to which a message is to be transferred. A messaging client with a low reliability link to the message server (i.e. a client which disconnects often) is more likely to require persistent storing of messages than a messaging client with a reliable connection, because in the latter case there is a higher likelihood of successful delivery of messages. In this way, the present invention enables the overhead of saving to persistent storage to be incurred only when the determining step suggests that persisting is justified. This enables a significant reduction in the number of disk writes compared with conventional approaches to persistent messaging.

For example, the invention may be applied to determine whether save operations can be omitted, in circumstances when conventional persistence management features of a messaging system suggest that it is desirable to save to persistent storage. The determining step of the present invention may be performed just prior to a save operation to determine whether the save operation can be omitted, or may be performed periodically for each client to determine whether persistent save operations can be dispensed with for all messages sent from or to a particular messaging client. Thus, the present invention may be integrated with known persistence management features and enables omission of some save operations that would involve writing to disk at the message server, for nominally-persistent messages.

In another embodiment, persistence management determinations may be made based on messaging client characteristics without requiring the sender client to specify whether a message should be considered 'persistent' or 'non-persistent'. In this embodiment, the present invention provides a replacement persistence management mechanism such that conventional mechanisms that insert or respond to 'persistent' or 'non-persistent' flags within messages are not required.

In one embodiment, the connectivity history which is used to determine whether to save data persistently includes numeric information relating to disconnections that were closely followed by reconnections (since this association in time implies an undesirable disconnect).

A second embodiment of the invention provides a method for managing persistence within a messaging network comprising the steps of: identifying persistence characteristics of a messaging client from which at least one nominally-persistent message is received; determining from said persistence characteristics whether data relating to the at least one message requires saving to persistent storage; and saving data relating to the at least one message to persistent storage in response to a positive result of said determining step, but omitting the saving operation for nominally-persistent messages in response to a negative result of said determining step.

For example, a message may be received from a "stateful" or "stateless" messaging client—a stateful messaging client being one that retains message state information in persistent storage and a stateless messaging client being one that does not persist state information. The messaging clients specify to the message server whether they have persistence capabilities of their own or not. A "stateless" messaging client is reliant on the message server for any persistent saving of message-related data.

The message server may comprise a publish/subscribe broker for matching received publications with subscriber-specified requirements. That is, the publish/subscribe broker compares published messages with registered subscriptions to identify messaging clients to send the message to. A third embodiment of the invention identifies a number or average number of matching subscribers for one or more recent messages received from a particular messaging client, and only saves new messages persistently if the number or average number of matching subscribers is above a threshold number.

In a further embodiment, the determining step determines the requirements for saving to persistent storage with reference to message delivery commitments of a service level agreement.

Additional aspects of the invention provide a data processing apparatus comprising a combination of hardware (and potentially software) components for use in a method as described above, and a computer program comprising a set of instructions implemented in program code for controlling a data processing apparatus on which the program executes to perform a method as described above. The computer program may be made available as a program product in which the program code is recorded on a recording medium, or the computer program may be made available for transfer to a data processing apparatus via a data transfer medium.

A data processing apparatus according to one embodiment of the invention comprises: a processor; a volatile data store; a non-volatile data store; and a message manager; wherein the message manager comprises: means for identifying characteristics of at least one messaging client involved in a message-based communication; means for determining from said characteristics whether data relating to the message-based communication requires saving to the non-volatile data store; and means for saving data relating to the message-based communication from the volatile data store to the non-volatile data store in response to a positive result of said determining step.

BRIEF DESCRIPTION OF DRAWINGS

Embodiments of the invention are described below in more detail, by way of example only, with reference to the accompanying drawings in which:

FIG. 3 shows a simple example of client characteristics data, such as may be held in a client connections database for use in persistence management according to an embodiment of the invention.

FIGS. 7A to 7C provide a schematic representation of a sequence of operations within a publish/subscribe messaging system including a persistence management method according to an embodiment of the invention; and FIG. 8 is a second example of client characteristics data, such as may be held in a client connections database of a publish/subscribe messaging system.

DESCRIPTION OF EMBODIMENTS

The present invention is applicable to managing message persistence, and is implementable within a data processing system or network where it is desirable to enhance messaging performance and/or to reduce the overhead of persistent handling of messages while keeping message delivery reliability within acceptable levels.

The problem of balancing message assurance and message performance applies both to a point-to-point messaging model and a publish/subscribe messaging model. In point-to-point messaging, a message is sent to a single destination—for example by a sender application program issuing a command via a messaging API to send the message to a named queue of a named message queue manager. A network of message queue managers handles the routing and transformation of messages from the sender system to the target queue. The named target queue is an input queue for the destination application program, and the destination application program asynchronously retrieves the message from this input queue (i.e. when the destination application program is ready to process the message).

In publish/subscribe messaging, subscribers specify the messages they wish to receive (for example by registering a subscription that specifies a topic string) and publishers send messages without specifying which subscribers should receive them. A comparison is made between topic names within a newly published message and the topic strings of a set of registered subscriptions, this comparison being performed at either an intermediate publish/subscribe message broker or a publish/subscribe matching engine implemented at each subscriber system. Other publish/subscribe solutions use message contents instead of topic names to determine which subscribers should receive which messages, or use a combination of topic names and filters that specify required message contents.

Figure 1:
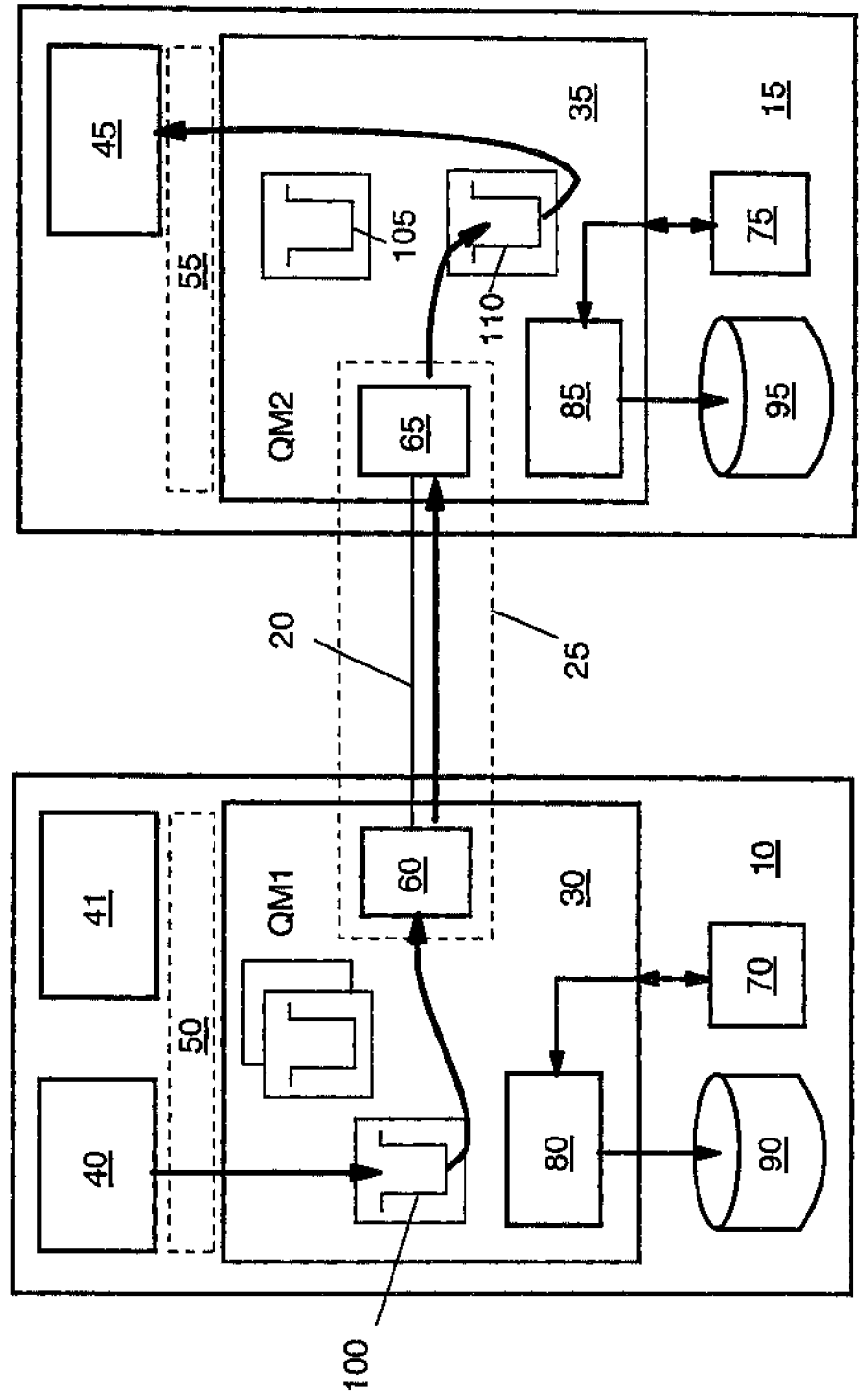
FIG. 1 is a schematic representation of a simplistic messaging network, as is known in the art.

A typical distributed messaging network comprises a plurality of heterogeneous data processing systems that each include a messaging component. FIG. 1 shows a simplistic example of a point-to-point messaging network including only two data processing systems 10, 15 connected via a communication link 20. A real messaging network may include, for example, hundreds of separate data processing systems communicating via wired or wireless connections. Each data processing system 10,15 in the messaging network includes a messaging manager 30,35, which may be implemented in computer program code or in hardware using electronic circuits. The messaging functions on a particular data processing system 10 may be integral with an application program 40, 41 that performs business processing, but in the present embodiment the application programs 40,41,45 and messaging managers 30,35 are separate but interoperating components of their respective data processing systems. The application programs 40,41,45 can communicate with each other via the messaging network, and each communicate with a local messaging manager 30,35 via a messaging interface (API) 50,55. Each messaging manager 30,35 relies on processing functions of a hardware processor (not shown) and on services provided by the operating system (not shown) on the data processing system on which it runs, and the messaging managers deal with any data transformations required to address operating system differences within the network.

The messaging system architecture of FIG. 1 facilitates relatively simple application program development, and addresses many of the problems associated with integration and interoperation between a diverse set of components within a heterogeneous distributed data processing environment. Common messaging functions can be implemented within a messaging manager 30,35 and the application programs 40,41,45 can be written to invoke functions of the respective local messaging manager via the messaging API 50,55. Messaging managers 30,35 such as the WebSphere MQ messaging manager programs from IBM Corporation provide asynchronous message communication via intermediate message repositories (message queues) that are managed by the messaging managers. In FIG. 1, message queues 100,105,110 are represented schematically as features of respective messaging managers but the physical representation of a queue is a data structure within system memory 70,75 (e.g. PAM) or within a non-volatile data store 90,95. The above-described components of a data processing system are interconnected via a communications bus within the data processing system, as is well known in the art.

A first application program 40 running on a first data processing system 10 can communicate with a remote application program 45 by issuing a 'put_message' command that is interpreted by the messaging API 50. The message is initially placed on a transmission queue 100 that is managed by the local messaging manager 30. The local message queue manager examines information within a header of each message placed in the transmission queue 100 to determine a next messaging manager within the network to which the message should be routed. A pair of cooperating message channel agents 60,65 (or 'movers') then handle transfer of relevant messages via a communication channel 25 that is established between them, moving messages from the transmission queue 100 to a queue 110 managed by the second messaging manager 35.

If the second messaging manager is merely an intermediate node of the network between the first messaging manager 30 and a destination messaging manager, the second messaging manager 35 places the message in a further transmission queue 105 that serves as a temporary repository for the message until the message can be forwarded to the next network node. Alternatively, if the second messaging manager 35 is the local messaging manager for the destination application program 45, the message will be placed in an application input queue 110 for retrieval by application program 45. The input queue 110 is serviced by the application program 45 when the application is ready to process the message.

This asynchronous message transfer via intermediate message repositories ('queues') can be performed quickly when connections are available, but is particularly beneficial in avoiding the need for dedicated end-to-end connections between remote application programs—allowing messages to be sent when the target application is not currently able to process the new messages. Although not shown in FIG. 1, there may be multiple asynchronous hops across a network from a first sending system 10 to a remote destination system 15.

In some known messaging systems, messages may be handled 'persistently' or 'non-persistently' as specified by a system administrator or sender application program. A persistence manager 80,85 writes messages to a respective persistent store 90,95 (for example, an allocated area of non-volatile disk storage) in accordance with the specified persistence required by the communicating application programs. Persistent messaging may be specified for all messages sent between certain applications or messaging managers, or persistence may be a requirement for only particular messages sent between those applications. A persistent message may be saved to the local persistent store 90 when the message is placed on the first transmission queue 100 by the local messaging manager 30 (i.e. a copy of the queue may be saved to disk storage), and a log record may be written to the local persistent store 90 both when the message is put to the transmission queue and when the message is successfully moved from the transmission queue 100 to the application input queue 110. The message and associated log records may be written to a second persistent store 95 on the second system 15 when the message is placed in the application input queue 110, and log records may also be written when the message is retrieved from this queue 110 by the target application program 45.

Some known systems provide support for distributed transactions that reduce the number of times message are hardened to disk (i.e. writing to persistent storage at commit of a distributed unit of work instead of on every 'put_message', 'get_message' or other update operation). Some known systems, in which many operations are running in parallel, combine log records for several operations in a single buffer and force them to disk at the same time. These features provide performance improvements, but persistence and log handling remain a significant performance bottleneck.

Thus, some known systems provide options for whether and when a message and log records are written to persistent storage. However, these options are predefined when the persistence requirements are specified and so known solutions do not take account of many of the circumstances that can affect messaging reliability within the messaging network.

Embodiments of the present invention enable the management of persistence to take account of a set of criteria that are relevant to the risk of message loss or loss of message state information. These criteria can include, for example, data relating to the connectivity history of a destination messaging client or data relating to the messaging client from which a message is received. The connection history or client characteristics may result from application behaviour or from device or communication link characteristics. The criteria can include, for example, data relating to an actual message loss and recognition of the need for persistence to avoid further losses to comply with obligations of a service level agreement. In an example publish/subscribe messaging system, the criteria can include the average number of subscribers receiving messages from a particular sender client, with messages only treated persistently if the number of subscribers exceeds a threshold. Further example criteria are discussed in the description of specific embodiments below.

A first embodiment of the invention provides an asynchronous messaging system that implements a determination of whether and when to perform a save to persistent storage based on an assessment of the characteristics of a messaging client that is involved in a message communication. A particular implementation of this first embodiment is described below with reference to FIGS. 2, 3 and 4.

Figure 2:
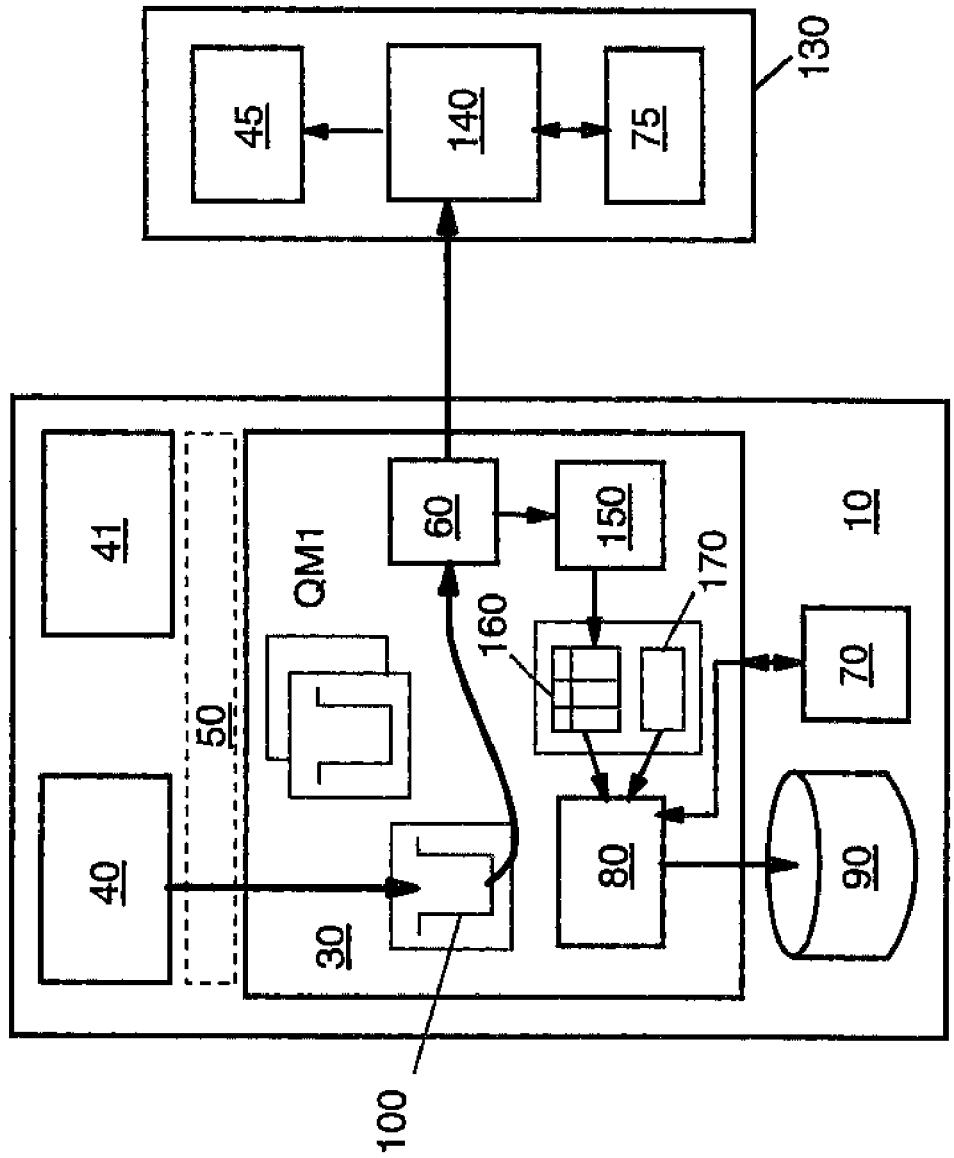
FIG. 2 is a schematic representation of an example messaging system according to an embodiment of the invention.
Figure 4B:
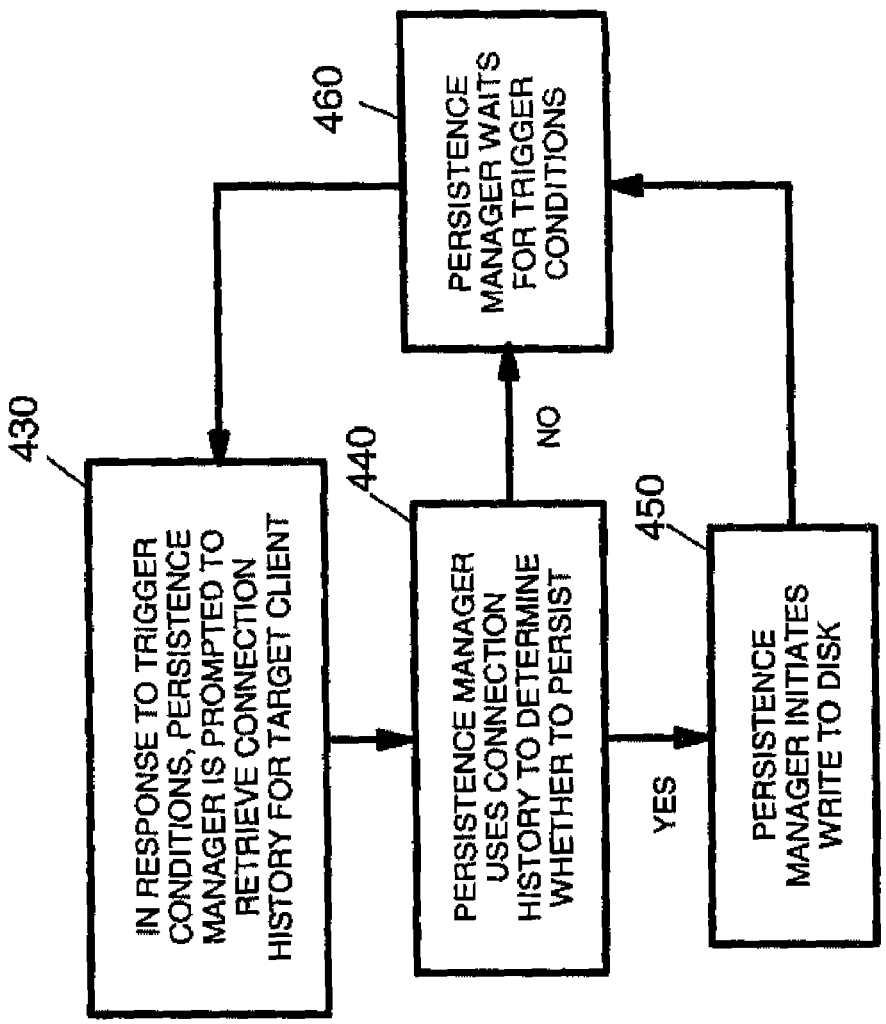
FIGS. 4A and 4B provide a schematic representation of the steps of a method for managing persistence according to an embodiment of the invention.
Figure 4A:
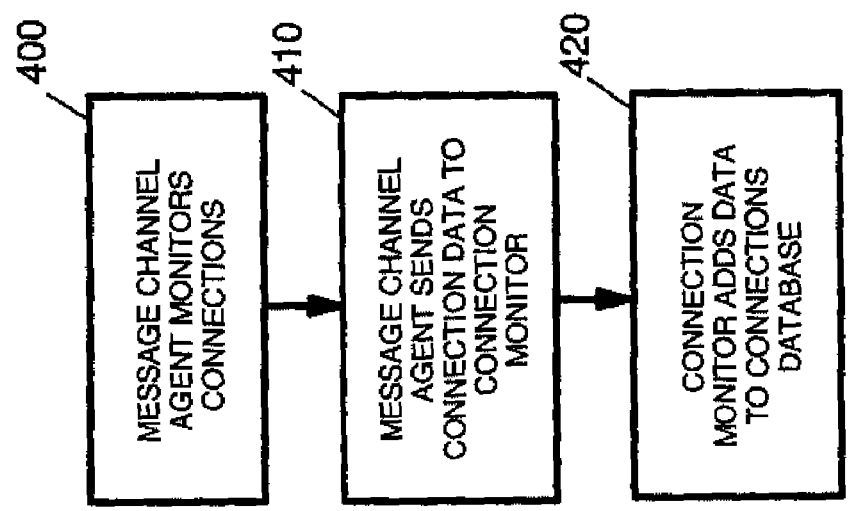

The persistence management method shown in FIG. 4 involves the step of identifying connection characteristics of a messaging client to which at least one message is to be sent, and using the connection characteristics when determining whether and when data relating to the message should be saved to persistent storage. As shown in FIG. 2, a message manager 30 is running on a first data processing system 10 and handles message transfer operations on behalf of an application program 40. The combination of the message manager 30 and the system 10 on which it runs is referred to as a message server in the context of this example embodiment. In FIG. 2, the sender application program 40 is local to the message manager 30 (i.e. is running on the same data processing system) but the message server 10,30 could equally be an intermediate node of a messaging network between a remote sender application 40 and a remote destination application.

A message channel agent or 'mover' component 60 of the message manager 30 is responsible for transferring messages from a transmission queue 100 managed by messaging manager 30 (and held in memory 70) to a message repository managed by a message handler program 140 (held in memory 75) running on a messaging client device 130. The client device 130 is also running an application program 45 that is the target destination for at least one message. As well as receiving confirmations of receipt of messages sent to the message handler program 140, the mover 60 performs the first steps of the method shown in FIG. 4A—monitoring 400 connections and reconnections between the message manager 30 on the message server 10 and the message handler program 140 on the messaging client 130. The mover 60 implements 410 a push model to pass connection information (times and client ID) to a connection monitor 150. The connection monitor receives this information and updates 420 a client connections database 160. This updating may be as simple as writing timestamped records of connections and corresponding client identification information into a database table, but in a first embodiment the connection monitor computes the time period between a connection and subsequent disconnection ('up time').

Disconnections can be detected by a "ping" exchange between a client and server (in this case sending a small packet from the server's message manager 30 to the client's message handler 140 and waiting for either an affirmative response, an exception or a timeout). In a TCP/IP network, a disconnection can be detected in the application layer through high level language implementations of TCP/IP sockets (for example, in the Java™ programming language) surfacing exceptions during a "ping" exchange. Exceptions may be generated by the implementation of the TCP/IP communications stack. Thus, connection duration or 'CONTIME' can be computed from detected connections and detected disconnections (using an estimate of actual disconnection times because of a lag between a disconnection and detection of the disconnection).

A simple example of a client connections database table is shown in FIG. 3, containing columns for client IDs 300 and connection duration or 'up time' 310. A third column 320 is shown in the table to enable differentiation between different metrics that may be used in persistence management determinations (although, in this example, only a single metric key 'CONTIME' is shown in the table for the metric of connection duration or 'up time').

In an alternative embodiment, connection statistics including the number of reconnections within a defined time period are recorded in the database 160. Disconnection statistics can be inferred by the persistence manager 80 from connections and subsequent reconnections. Various other metrics associated with connection availability, such as reconnection rates or 'down time', may be saved to a database table 160 (such as that shown in FIG. 3) by the connection monitor 150 or may be calculated by the persistence manager 80. For example, the time for which a client remains disconnected ('down time') can be estimated by the connection manager 150 or the persistence manager 80 from the time difference between a detected disconnect and a detected reconnection by the client.

In the first embodiment, a set of select statements are held in system memory 170 of the first data processing system 10 for use by the persistence manager 80 to extract 430 connectivity information from the client connections database 160. The select statements may be a set of predefined SQL queries. The persistence manager applies the select statements to the database 160 in response to trigger conditions (described below), to extract statistical data representing the connection history of the target application program 45. In the first embodiment, the select statements themselves incorporate threshold values for connection metrics. Therefore, any positive result arising from the persistence manager 80 applying a select statement to the database is an implicit indication that a save to persistent storage should be performed. The incorporation of threshold values and other selection conditions within a set of select statements (such as SQL queries) facilitates efficient comparison with a number of separate conditions and avoids the need for the persistence manager 80 to perform separate data extraction and then data analysis steps. A save to persistent storage can be performed when any one of the threshold values is exceeded.

Various trigger conditions can prompt the persistence manager to obtain 430 connection history data for a particular client (for example, Client 1). For example, the operation of saving a message to a message queue (buffer storage) in preparation for transfer to Client 1 may be a trigger.

A first example select statement as set out below can be used to determine whether the client's connection history indicates 2 or more reconnections within a defined time period.

```
SELECT
    VALUE
FROM
    MONITOR_STATISTICS
WHERE
    CLIENT_ID= 1
AND
    STATISTIC_TYPE= 'CONNS_PER_UNITTIME'
AND
    VALUE>2;
```

This select statement would produce a positive output if the number of connections by Client 1 within a predefined time period exceeds 2 (i.e. reconnections following a disconnection exceeds 1). In this first example, a positive output from the select statement is sufficient to determine that messages for this client should be saved persistently. Referring to FIG. 3, and assuming this represents the connections within a defined unit of time, the example select statement set out above would yield a positive result for client 1 (3 connections) but an equivalent select statement for client 2 would yield a null result.

Any positive result for a particular client negates the need for any other select statements to be applied (since we already know that persistence is desirable without checking other thresholds)—and so the evaluation by the persistence manager is stopped at this point. The persistence manager initiates a write to disk of any new messages and message state changes for this client.

A second example select statement determines whether to persist or not based on whether the average duration of the client's connection to the server (average "up-time" as determined from information provided by the connection monitor 150) is below a threshold such as 10 minutes:

```
SELECT
    VALUE
FROM
    MONITOR_STATISTICS
WHERE
    CLIENT_ID=1
AND
    STATISTIC_TYPE='AVG_UPTIME'
AND
    VALUE<10;
```

A positive result implies a need to save persistently. The above examples looking at connections within a time period and average 'up time' are merely illustrative and it will be clear to persons skilled in the art that other criteria associated with the reliability and duration of a client's connections to the server may be used in the determination of whether to save persistently.

As noted above, the persistence manager may respond to all positive results of a selection by determining that any message and message state should be saved persistently. However, in an alternative embodiment, the persistence manager may combine values extracted by select statements with other selected values to generate an overall weighting value representative of several 'risk factors' for Client 1. Such an aggregation of values using multiple select statements that include threshold values still involves relatively little processing by the persistence manager in order to make a determination about whether to save message rated data to persistent storage.

In another embodiment, the persistence manager extracts connectivity metrics from the database for a messaging client, and then processes the extracted data to determine 440 a value or set of values representing a risk of message loss. The risk value or values can then be compared 440 with threshold values to determine whether to save data relating to a message to persistent storage 90 at the message server. This alternative defers some processing compared with select statements that incorporate threshold values, and may increase processing time, but it also enables a balancing between different connection characteristics and other risk factors.

Referring to the examples above, more than a threshold number of reconnections within a defined period of time can be used to infer that the target application program 45 is also likely to disconnect in future. The data representing recent connection history can be used to infer a level of risk of message loss, which will be relatively high for a client that has a high reconnection rate. This high risk is especially relevant to client devices 130 that do not themselves have the capacity to write messages or message state information to persistent storage, or only have capacity to write minimal information locally on that device 130. The solution in this case is to write message-related data to persistent storage 90 at the first data processing apparatus 10.

If a messaging client connects to the message server via an unreliable link, a decision may be made to save all messages persistently before transferring to the client. When the client connects via an apparently stable link, a decision can be made to avoid writing messages to persistent storage on the basis that the client is likely to remain connected during the transfer.

The determinations by the persistence manager may be repeated at regular time intervals, or on receipt of each new message into the transmission queue 100, or immediately prior to transfer of each message by the mover 60, or at other appropriate times as determined by configuration information for the persistence manager 80. In the present embodiment, the determination of whether to save a message persistently is performed by the persistence manager 80 when a new message is buffered (i.e. saved to a message queue) in preparation for delivery to a messaging client. A value representing an estimated level of risk of message loss is derived from data held in the client connections database, and is compared with a threshold value to determine whether data relating to the message should be saved persistently or not.

Figure 5:
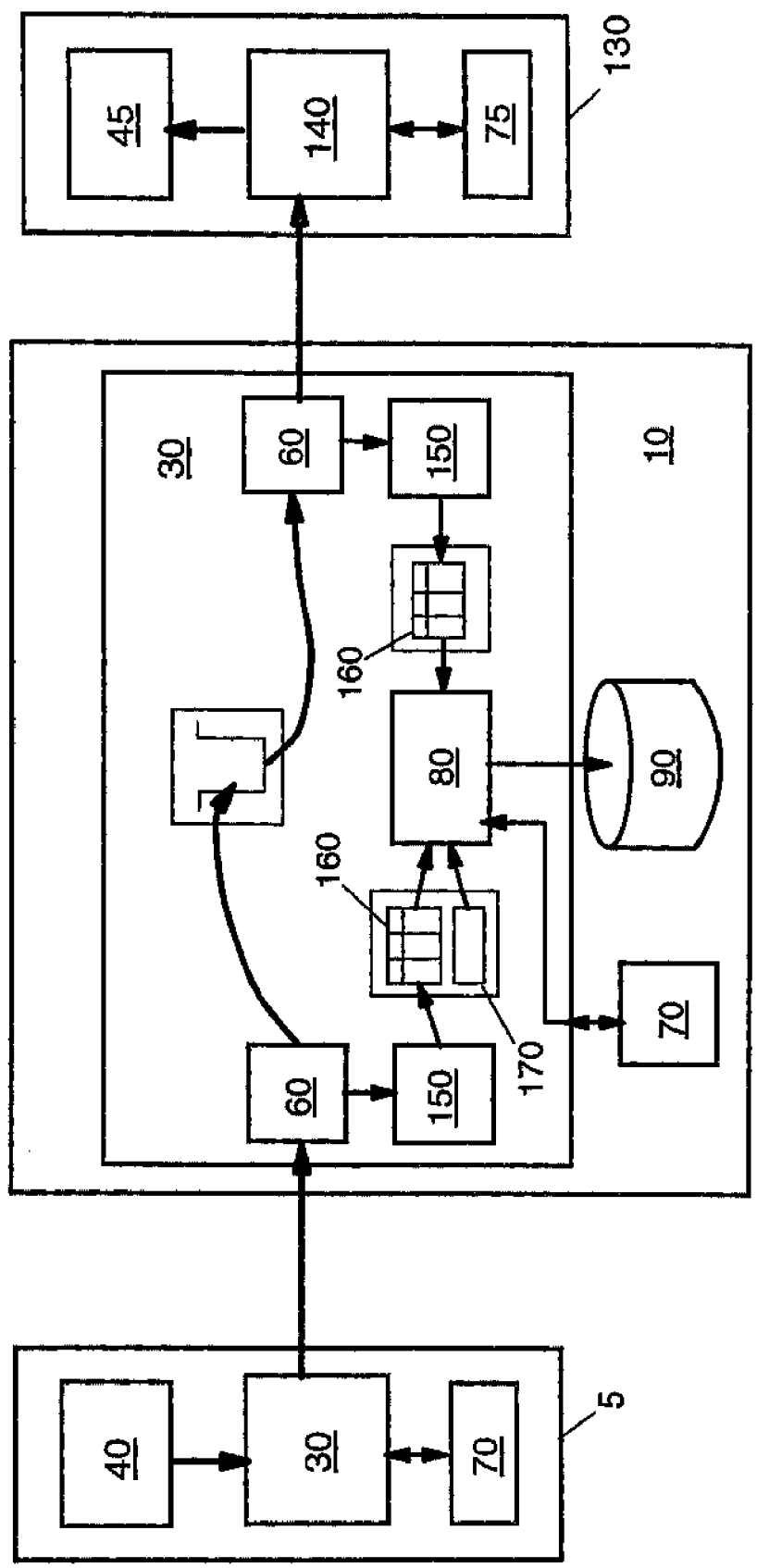
FIG. 5 represents an example messaging system according to another embodiment of the invention.

The persistence manager 80 can assess the history of a client's interaction with the message server to identify a client that is configured to disconnect after n seconds of inactivity, and can respond to this by scheduling a save to persistent storage just prior to the next anticipated disconnection. Alternatively, the persistent manager may adjust the value representing risk of message loss by a factor inversely proportional to the time remaining until the anticipated disconnect, increasing the tendency to save messages persistently as an anticipated disconnection time approaches. With reference to FIG. 5, it should be noted that a message server (comprising a message manager 30 running on a data processing system 10) may be an intermediate node of a messaging network between a sender application 40 on a first client device 5 and a target destination application program 45 on a remote device 130. In such circumstances, information relating to the sender messaging client's characteristics may be used in addition to information relating to the target messaging client's characteristics to determine whether message-related data should be saved to persistent storage.

For example, one embodiment of the present invention makes persistence decisions according to whether or not a sender messaging client saves messages and message state information persistently or relies on the message server for any saving to persistent storage. This is represented schematically in FIG. 5 where connection characteristics data relating to each of a sender application 40 and a destination application 45 is held in database tables 160 and is evaluated by respective rules 170 that are applied by a persistence manager 80.

A further embodiment of the invention implements persistence management within a messaging system that includes a message broker implementing a publish/subscribe message distribution mechanism. In publish/subscribe messaging, published messages are compared with subscription requirements of registered subscribers to identify messaging clients that wish to receive a particular message.

Figure 6:
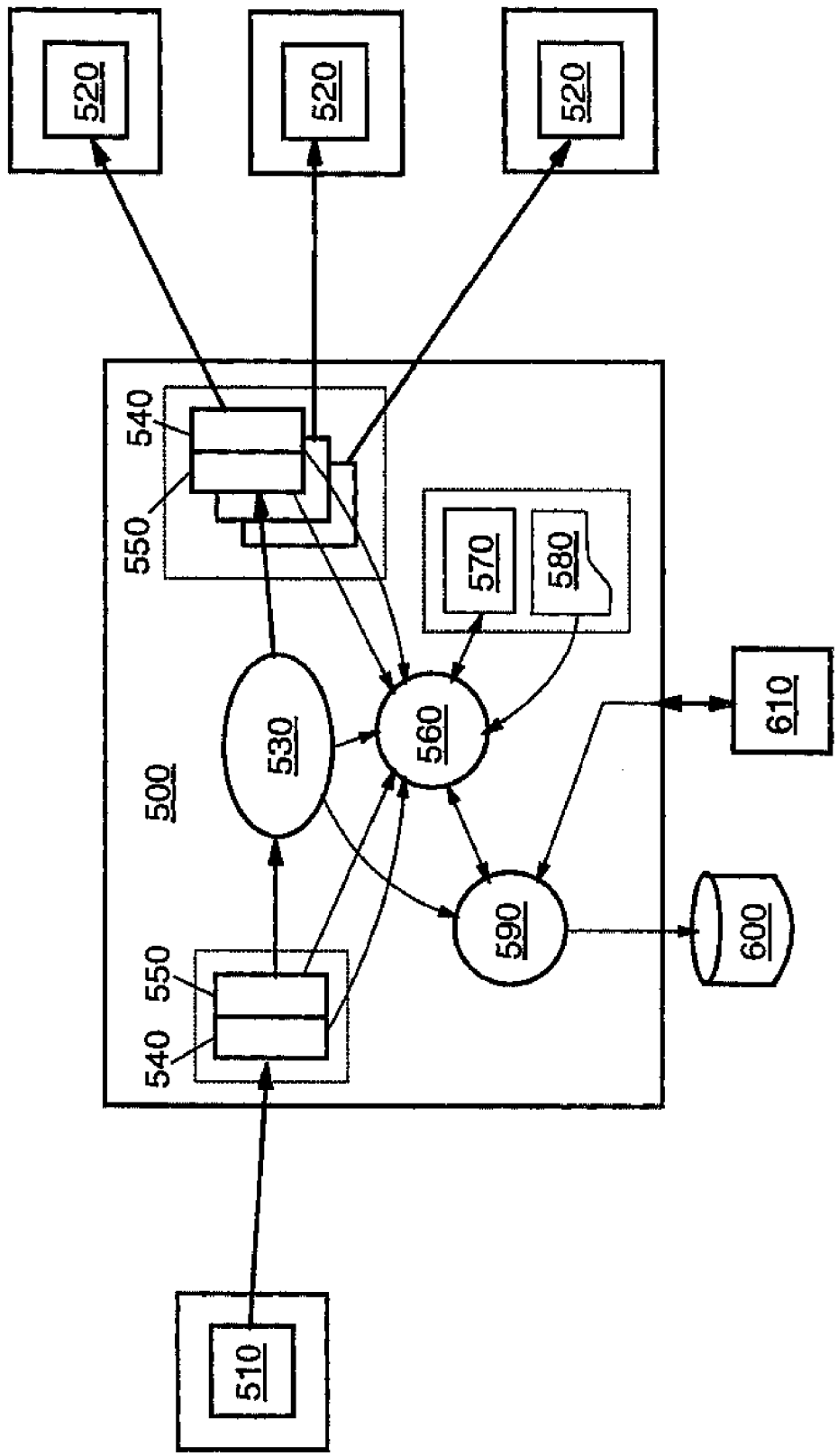
FIG. 6 represents an example messaging system including a publish/subscribe broker, according to another embodiment of the invention.

The exemplary publish/subscribe system of FIG. 6 provides a message broker 500 as an intermediate network node between publishing clients 510 and subscriber clients 520. The message broker includes a matching engine 530 that compares topic name strings within headers of received messages with topic strings specified by subscribers, and the messages are then routed to the matching subscriber clients 520. The message broker 500 is a second example of a message manager, which is implementable in computer program code such as the Java programming language, and which provides messaging support on behalf of sender and receiver messaging clients. Within the message broker 500, each client has a communications stack 540 and a protocol handling module 550 for marshalling and unmarshalling of the software's internal representations of the messages and protocol to and from their canonical byte formats to allow messages to flow over the network connections. The communications stack has access to a TCP/IP socket for communications with the external network.

Figure 7B:
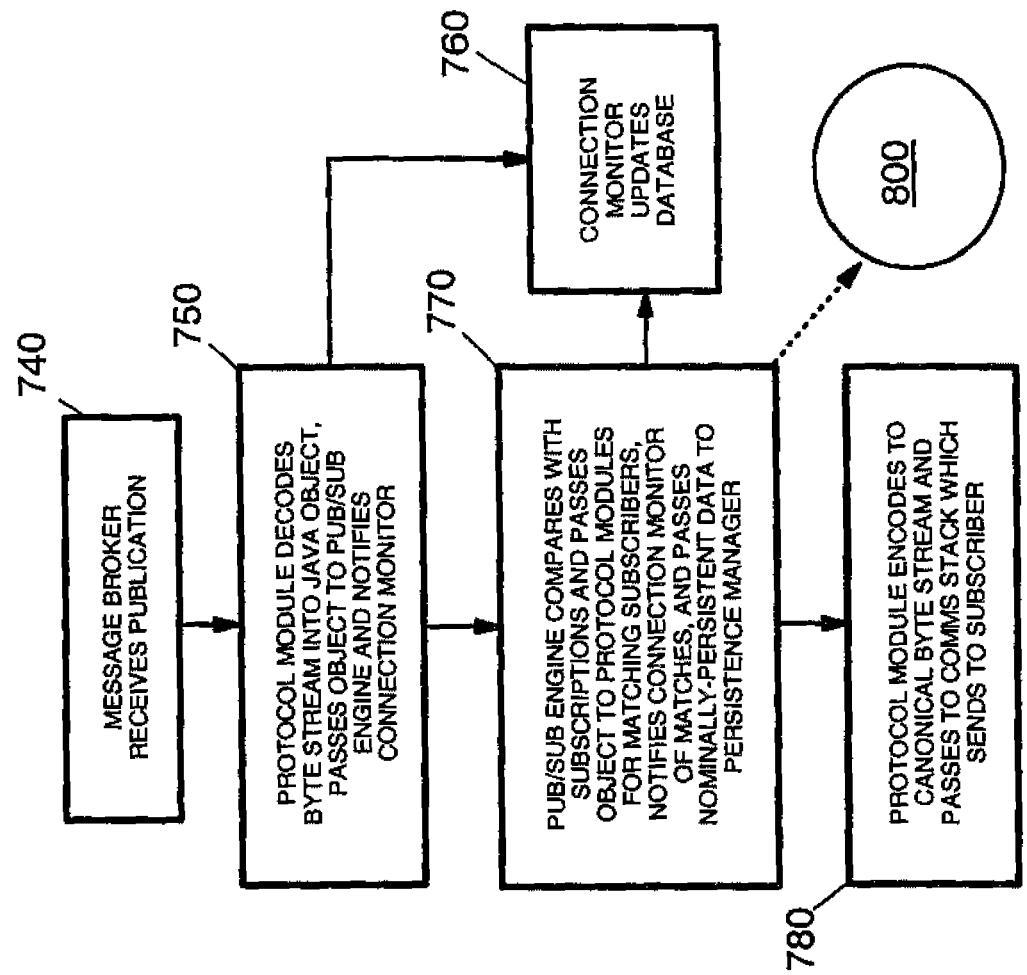
Figure 7A:
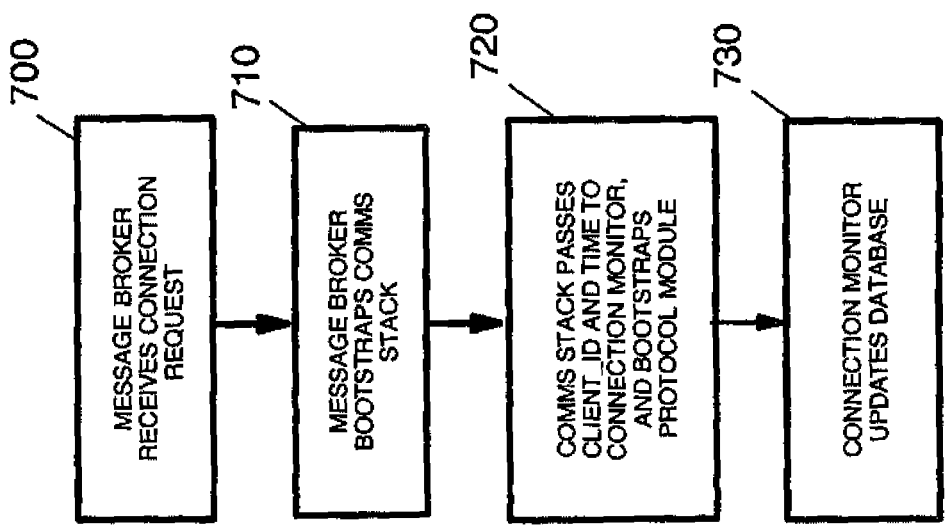

FIG. 7 shows a sequence of operational steps within a message broker implementing persistence management according to an embodiment of the present invention. The message broker 500 listens on a particular TCP port for newly established client connections. As shown in FIG. 7A, on receipt 700 of an inbound connection request, the message broker 500 bootstraps 710 a communications stack 540 for that client. This stack is responsible for maintaining the connection with the client and monitoring the current state of the socket connection. The communications stack also passes 720 a client identifier and a timestamp for the new connection to a connection monitor 560. The communications stack also bootstraps 720 a protocol handling module 550. The protocol module is responsible for decoding and encoding the message formats and communication protocol to and from canonical byte format (as serialised over the physical network link) into an internal object representation that can be consumed by the message broker. For example, the protocol module 550 will unmarshal inbound message publications from a client into object form and submit them to the publish/subscribe matching engine 530 for delivery to subscribers. The protocol module 550 is responsible for fulfilling connection, subscription and other requests from the client. The connection monitor 560 updates 730 a connections database with the client ID and timestamp for the new connection.

Described below with reference to FIGS. 7B and 7C is an example scenario in which a connected client 510 wishes to publish a message via the message broker 500. The client 510 sends the publication to the broker as a byte stream, where it is received 740 by the communications stack 540. The received byte stream is passed to the protocol module 550 which decodes 750 the publication from canonical byte stream format into a publication object. The protocol module 550 invokes a "publish" method on the publish/subscribe engine 530, which matches 770 topic names within incoming publications with topic names within registered subscriptions made by other subscribing clients 520. Matches may be exact or may rely on wildcards within the subscriptions. A set of matching subscribers is thus derived from the total set of subscribers that are currently registered with the publish/subscribe matching engine 530. The protocol handling module 550 and the publish/subscribe matching engine 530 each send information to the connection monitor 560 which updates 760 the connections database.

The publish/subscribe matching engine 530 then passes 770 the message object to an appropriate protocol handler module 550 for each of the identified subscribers, where the protocol handler module encodes 780 the message object for transmission across the network to respective identified subscribers, and an associated communications stack sends the encoded byte-stream message to subscribers. The publish/subscribe matching engine is also responsible for identifying nominally-persistent messages (i.e. messages designated "persistent" by the sender application) and passing data relating to such messages to a persistence manager. In FIG. 7B, a dotted sequential line is shown to another operation 800, since the receipt of message data by the persistence manager is one of a number of possible trigger conditions for performing a persistence determination as described below with reference to FIG. 7C.

In a first example of the invention, the size of the set of subscribers which match the publication is passed to the monitor component 560 as statistical data. The number of matching subscriptions per publication can be used as an indication of how valued a particular publisher's messages are, and can be used as a basis for determining whether to save message-related information to persistent storage. For example, if the average number of subscribers for a particular client's messages is less than 10, a determination may be made not to save those messages persistently.

The number of matching subscribers is inserted 760 into a database table 570 by the monitor component 560. In this embodiment, the monitor component 560 fulfils two tasks: 1) collection and maintenance of the database of statistical data from other components within the message broker system, and 2) determination of whether to persist or not based on rules 580 saved within the system. Within the message broker 500, each client has a unique identifier which serves as a key for accessing data within the database 570.

If a message published by sending to the publish/subscribe message broker is marked as "persistent" by the sending client, the publish/subscribe matching engine passes 770 the message to a persistence manager 590. At this stage the nominally-persistent message is merely a candidate for persistent storing by the persistence manager, and the message is held in volatile memory 610, since the final decision about whether to save the message persistently has not yet been made. If the published message is marked as "non-persistent", the message is only held in memory 610 and is not passed to the persistence manager at 590 all.

The persistence manager is responsible for persistent storing of message data to non-volatile disk storage 600 under transactional control. At this point, either when the persistence manager receives new data or in response to some other trigger condition, the persistence manager is invoked 800 and then the determining function of the monitor component 560 is invoked 810 to determine whether persistence is required or not for the message. The persistence manager 590 preferably invokes 810 the monitor component 560, passing in the client ID of the connecting client.

The monitor component 560 applies 820 a set of stored rules 580 to determine whether to persist or not for a given client. The rules may be saved as a simple text file containing a series of SQL queries (or select statements) describing the rules, with one SQL query corresponding to each rule. The value returned to the persistence manager 590 by the monitor component 560 is a simple Boolean true or false value indicating whether to persist or not.

An example select statement implementing a simple rule is:

```
WITH
    AVG_SUBS_TO_PUB(AVG)
AS
    (
        SELECT
            AVG(METRIC_VALUE)
        FROM
            MONITOR_STATISTICS
        WHERE
            CLIENT_ID='client-id'
        AND
            METRIC_KEY='SUBS_TO_PUB'
    )
SELECT
    AVG
FROM
    AVG_SUBS_TO_PUB
WHERE
    AVG>10;
```

This statement will return 1 row (non-zero) if the client's average number of matched subscriptions per publication is greater than 10, or zero rows if not. In this case Boolean true can easily be mapped to a non-zero number of rows and Boolean false to zero rows returned by the statement. Having obtained a positive persistence decision from the monitor, the persistence manager saves 830 the message to persistent storage (for example, handling each new message serially). Applying statements such as this to stored metrics for a number of clients allows a determination to be made regarding whether the persistence manager 590 can avoid persistent saving of messages and message state for some clients. In this first example, the select statement can be used to determine when it is possible to avoid persisting message data for messages received from a publishing client for which there are few interested subscribers. A false result leads to the persistence manager either discarding 840 the nominally-persistent data (as shown in FIG. 7C) or merely retaining the data in volatile memory to enable potential persistent saving later on.

FIG. 8 represents a second example of a database table 570 that is held at the message broker 500. The table includes a set of metrics, held at the broker, associated with two clients identified by their respective unique CLIENT_ID. Two metric types are shown in the table—CONTIME (the time period between a connection and identification of disconnection) and SUBS_TO_PUB (the number of subscribers per publication). If 10 is a threshold for the average number of subscribers, above which messages are persisted and below which messages are not persisted, the example select statement above will result in messages published by client 1 being persisted.

In alternative embodiments, the communications stack or protocol handling module can include data processing functions and provide statistical input to the monitor component. The communications stack can provide connection related statistics (for example computing the difference between a timestamp taken at connection time and a timestamp taken as a disconnection is identified, to yield a measure of uptime for the client) whilst the protocol module can provide behavioural detail at the protocol level regarding how the client uses the broker. For example, this behavioural data may comprise a count of the number of publications during the lifespan of a connection, to give an indication of whether the client is more commonly a publisher or a subscriber. If all of these statistics are compiled within the monitor, more complex rule processing is possible that takes into account statistics from the publish/subscribe matching engine, connectivity behaviour and other client behaviour such as the client's particular use of the protocol.

A second example select statement will yield a "persist" result if the client's average up-time (as determined from information gathered from the communications stack) is less than 10 minutes per visit:

```
WITH
    AVG_UPTIME(AVG)
AS
    (
        SELECT
            AVG(METRIC_VALUE)
        FROM
            MONITOR_STATISTICS
        WHERE
            CLIENT_ID='client-id'
        AND
            METRIC_KEY='CONTIME'
    )
SELECT
    AVG
FROM
    AVG_UPTIME
WHERE
    AVG<10;
```

The select statement above is dependent on the communications stack taking a timestamp at connect time, and timestamping again at disconnect time. The average uptime may be computed either by the communications stack subtracting the former timestamp from the latter to obtain the delta (which is then sent to the monitor component) or the monitor component performing the subtraction.

Referring to the example metrics of FIG. 8, neither of Clients 1 and 2 has an average uptime of less than 10 minutes so this second example select statement will not yield a positive result in this case.

Another rule that may be implemented within an SQL query held in the rules repository returns a "persist" result if the client has a higher ratio of publications to subscriptions (i.e. if the particular broker implementation focusses most attention on messages sent primarily by publishers). This example also shows how a composite of two statistics can drive rules. The monitor component is given a statistic (per connection) from the protocol module—in this case a count of subscription requests—that is entered into the table using the METRIC_KEY 'SUBS_PER_CONNECT'. A count of publication requests is entered into the table using the METRIC_KEY 'PUBS_PER_CONNECT'. The corresponding example select statement is as follows:

```
WITH
    AVG_PUBS(AVG, CLIENT_ID)
AS
    (
    SELECT
        AVG(METRIC_VALUE),
        CLIENT_ID
    FROM
        MONITOR_STATISTICS
    WHERE
        CLIENT_ID='client-id'
    AND
        METRIC_KEY='PUBS_PER_CONNECT'
    )
,
    AVG_SUBS(AVG, CLIENT_ID)
AS
    (
    SELECT
        AVG(METRIC_VALUE),
        CLIENT_ID
    FROM
        MONITOR_STATISTICS
    WHERE
        CLIENT_ID='client-id'
    AND
        METRIC_KEY='SUBS_PER_CONNECT'
    )
SELECT
    AVG_PUBS.AVG,
    AVG_SUBS.AVG
FROM
    AVG_PUBS,
    AVG_SUBS
WHERE
    CLIENT_ID='client-id'
AND
    (AVG_PUBS.AVG/AVG_SUBS.AVG) > 1
;
```

Note that this represents semantic information about how the protocol is being used by the client. Publications and subscriptions are a simple example, but additional verbs such as commit and rollback (and other transactional operations) can also be used within the rules used to determine whether to save persistently.

It will be understood by persons skilled in the art that the particular rules, and the select statements implementing those rules, set out above are merely examples of rules that may be used in a dynamic determination of whether saving to persistent storage appears justified. The determination can be based on one characteristic or a large number of characteristics of a sender or receiver messaging client that is involved in message based communication. Various alternatives and modifications to the embodiments described in detail above are possible within the scope of the invention as defined in the claims of this specification.

It will also be understood by persons skilled in the art that the message server and message broker described above with reference to FIGS. 2-5 or FIGS. 6-8, and other elements of the described methods and apparatus, may be implemented in computer program code or in logic circuits or other hardware.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method in a data processing system for managing persistence within a messaging network comprising the steps, performed by a message server of:
    identifying at least one characteristic of at least one messaging client involved in a first message-based communication;
    determining from said at least one characteristic whether data relating to the message-based communication requires saving to persistent storage;

saving data relating to the message-based communication to persistent storage in response to a positive result of said determining step;

receiving a second message-based communication; and responsive to the second message being identified as non-persistent by a sender messaging client, not saving second data relating to the second message-based communication.

2. A method according to claim 1, wherein the step of identifying at least one characteristic comprises identifying connection characteristics of a messaging client to which at least one message is to be transferred by the message server.

3. A method according to claim 2, wherein the connection characteristics comprise data relating to previous connections between the messaging client and the message server.

4. A method according to claim 3, wherein the connection characteristics represent a number of disconnections of the messaging client from the message server within a defined period of time.

5. A method according to claim 3, wherein the connection characteristics represent an average duration of connections between the messaging client and the message server.

6. A method according to claim 1, wherein the messaging network comprises at least one publishing client and at least one subscriber client and a publish/subscribe message broker for matching received publications with registered subscriptions, wherein the step of identifying characteristics of at least one messaging client comprises determining a number of matching subscribers for messages published by the at least one messaging client.

7. A method according to claim 1, wherein the not saving comprises retaining the data in volatile memory.

8. A method according to claim 1, wherein the step of identifying at least one characteristic comprises identifying whether a messaging client, from which at least one nominally-persistent message is received, is capable of saving message-related data persistently.

9. A computer program product in a computer readable medium comprising computer program instructions, for controlling the performance of operations of a data processing apparatus on which the computer program instructions execute, to perform a method according to claim 1.

10. A data processing system comprising:
a processor;
a volatile data store;
a non-volatile data store; and
a message manager, wherein the message manager comprises:
identifying means for identifying at least one characteristic of at least one first messaging client involved in a message-based communication;
determining means for determining from said at least one characteristic whether data relating to the message-based communication requires saving to the non-volatile data store;
saving means for saving data relating to the message-based communication from the volatile data store to the non-volatile data store in response to a positive result of said determining step;
receiving means for receiving a second message-based communication; and
means, responsive to the second message being identified as non-persistent by a sender messaging client, for not saving second data relating to the second message-based communication.

* * * * *